June 2, 1953 — H. BAXTER — 2,640,495
ELECTROMAGNETICALLY CONTROLLED VALVE
Filed March 14, 1950 — 4 Sheets-Sheet 1

INVENTOR.
HARRY BAXTER
BY Sanford Schnurmacher
ATTORNEY

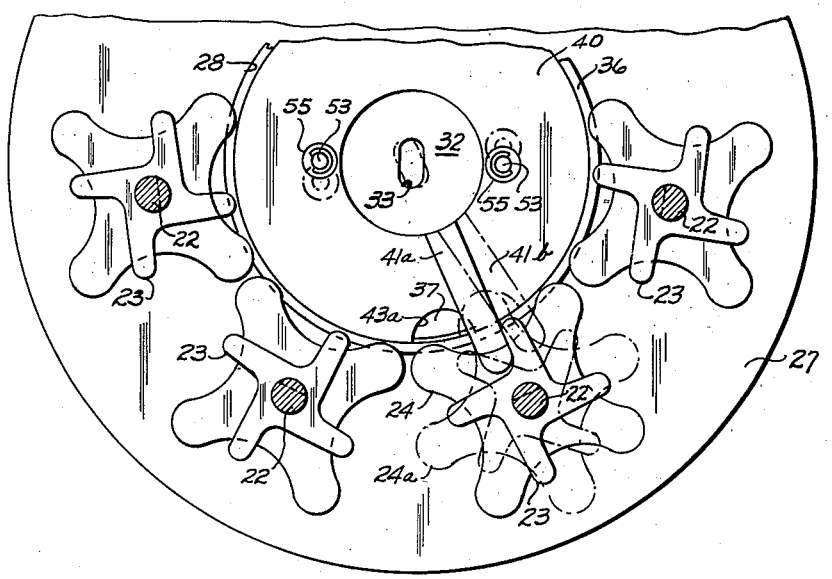
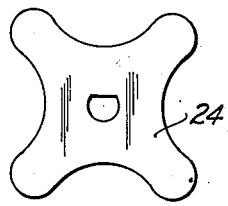
Fig. 4
Fig. 5
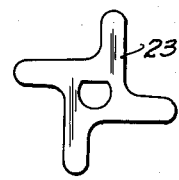
Fig. 6
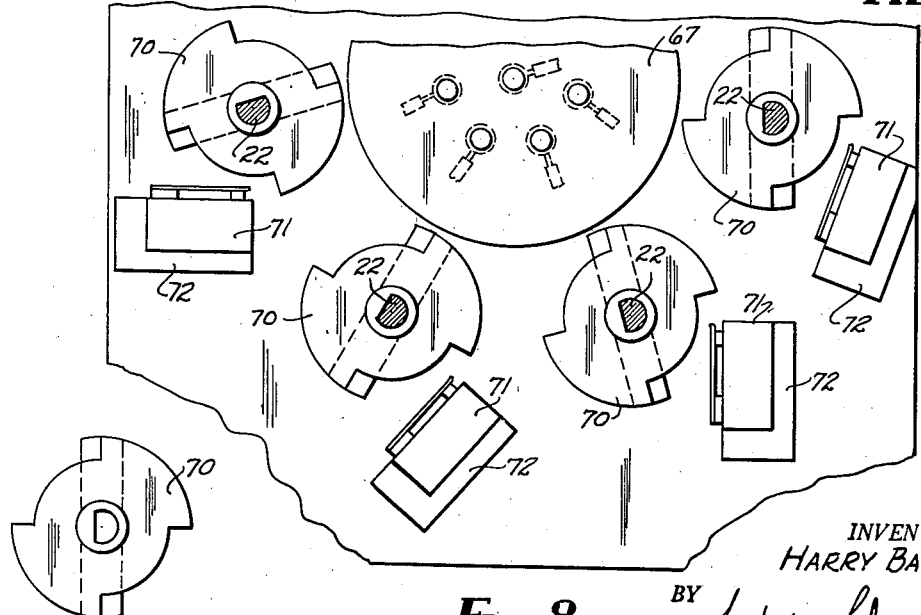

June 2, 1953  H. BAXTER  2,640,495
ELECTROMAGNETICALLY CONTROLLED VALVE
Filed March 14, 1950  4 Sheets-Sheet 3

INVENTOR.
HARRY BAXTER
BY Sanford Schurmacher
ATTORNEY

Patented June 2, 1953

2,640,495

UNITED STATES PATENT OFFICE 2,640,495

ELECTROMAGNETICALLY CONTROLLED VALVE

Harry Baxter, Garretsville, Ohio

Application March 14, 1950, Serial No. 149,625

8 Claims. (Cl. 137—635)

This invention relates to valve operating means and particularly to an electromagnetic selector adapted to selectively control a plurality of valves.

The primary object of this invention is to provide an electromagnetic selector and valve operator that is an improvement over the valve operator disclosed in the application for Letters Patent of the United States, Serial Number 769,478, filed by me on August 19, 1947, now Patent Number 2,530,563.

Another object is to provide an electromagnetic valve operator for operating a plurality of valves arranged in a circle. The said operator being capable of selectively opening, closing, or passing each of the said valves during one operating cycle.

Further objects are to provide a valve operator of the type stated that is rugged in construction, reliable in operation, and economical to manufacture.

These and other objects of the invention will become apparent from a reading of the following specification and claims together with the accompanying drawing wherein:

Figure 3 is a top plan view of the operator and its associated valve cams taken substantially along the line and in the direction of the arrows 3—3 of Figure 1;

Figure 4 is a top plan view of one of the secondary valve cams;

Figure 5 is a side elevation of one of the pump and solenoid relay switch operating cams;

Figure 6 is a top plan view of one of the primary valve cams;

Figure 7 is a top plan view of the cam shown in the Figure 5;

Figure 8 is a view taken along the line and in the direction of the arrows 8—8 of the Figure 1;

Conducive to a better understanding of this invention, it may be well to point out that this valve operator is primarily intended to control a plurality of valves arranged in a circular plane about a common center.

The number of valves that can be operated is unlimited, being restricted only to the number that can be positioned around the circumference of a circle of a given diameter. By enlarging the size of the circle any number of valves may be controlled.

Figure 1:
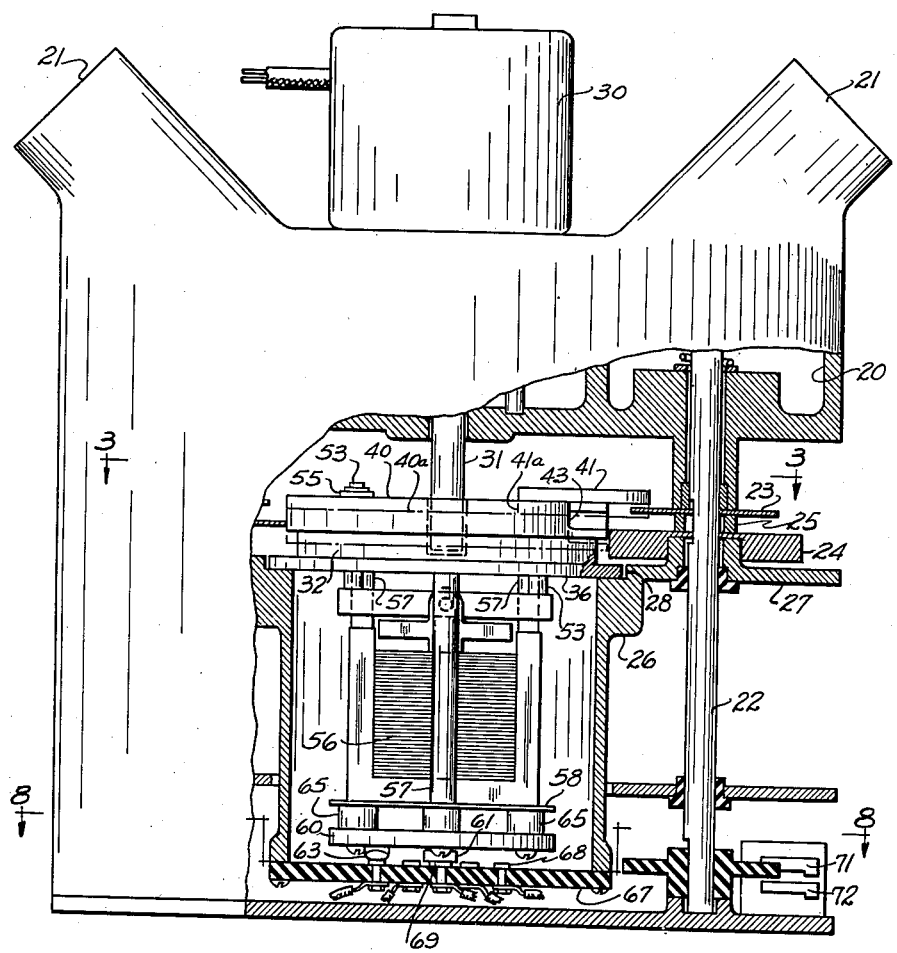
Figure 1 is a side elevation of a controller for a multiple zone heating system such as is described in my aforementioned co-pending patent application, with parts broken away to show the electromagnetic valve operator that is the object of this invention.
Figure 2:
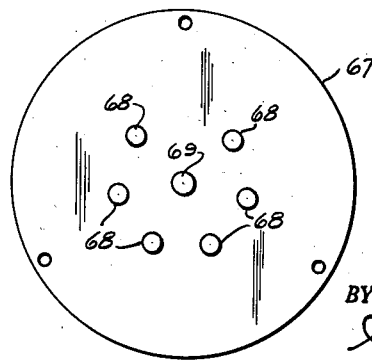
Figure 2 is a top plan view of the distributor plate.

The operator illustrated in the Figure 1 of the drawings is shown in association with a six valve heat controller for a hot water system such as is described in my aforementioned co-pending patent application.

Reference numeral 20 indicates a circular manifold which receives water from the boiler and distributes it through valved ports 21 to radiators in each of the zones. The stem 22 of each valve extends below the manifold 20, through the operator case flange 27 and is journaled at its lower end in the base of the controller case.

The operator case 26 is cylindrical in form with an outwardly extending flange 27 through which all of the valve stems extend in spaced relationship equidistant from the center of the case. A shouldered circular opening 28 is located in the center of the operator case top. The opening 28 has a center common with that used to locate the valve stems 22.

Figure 14:
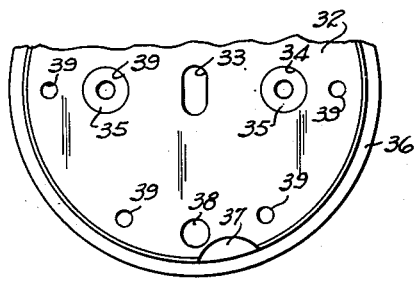
Figure 14 is a top plan view of a portion of the rotor plate showing the cam slot.

A rotor plate or disc 32 having a bearing flange 36 is rotatably seated within the circular shouldered opening, as illustrated in the Figures 1 and 3. The plate 32 has a semi-circular cam notch 37 cut in the edge of its periphery as shown in the Figure 14.

Figure 10:
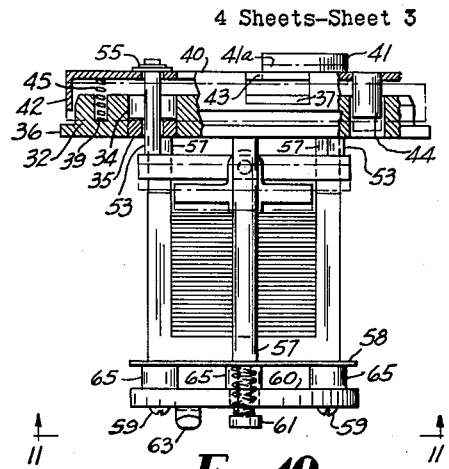
Figure 10 is a side elevation, partly in section, of the electromagnetic operator.
Figure 11:
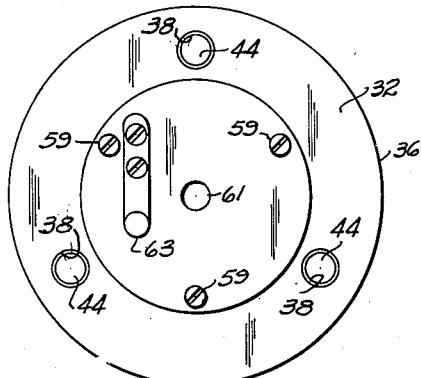
Figure 11 is a view looking in the direction of the arrows 11—11 of the Figure 10.
Figure 13:
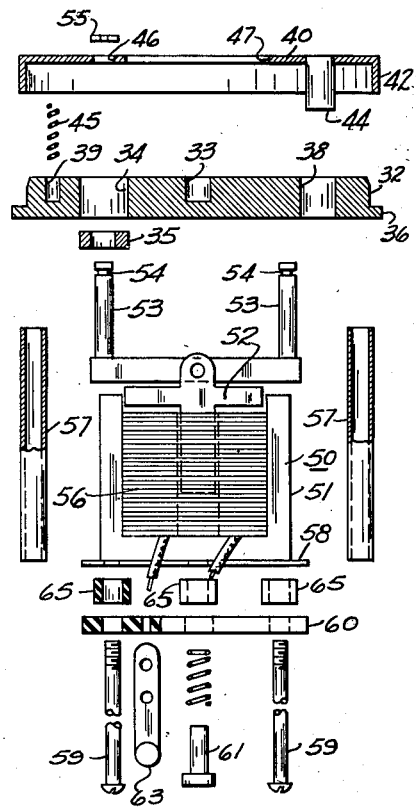
Figure 13 is an exploded view of the operator, partly in section, taken along the line and in the direction of the arrows 13—13 of the Figure 9.

A solenoid 50 is mounted on the underside of the rotor plate 32 as shown in the Figures 1, 10 and 13. The solenoid has the usual laminated magnetic U frame 51 and hollow magnetic winding 56 and is supported in spaced relationship with the rotor plate by means of the long tubular spacers 57, through which the mounting screws 59 are passed. There are three spacers 57, each of which is located equidistant from the other, with its upper end abutting the under-side of the rotor disc 32 and its lower end abutting the upper face of the frame base 58. Three short spacers 65, aligned with the tubular spacers 57, are positioned between the frame base 58 and the dielectric plate 60. The screws 59 pass through holes in the plate 60, the short spacers 65, holes in the base 58, the tubular spacers 57 and screw into threaded holes in the rotor plate 36. The spacing of these mounting elements is shown in the Figure 11, wherein the heads of the screws 59 are shown in triangular spaced relationship.

A T-shaped armature 52 is slidably mounted in the center of the winding 56 and between the ends of the U frame. A yoke having upwardly extending pins 53 is secured to the top of the armature 52. The yoke pins 53 extend through holes 34 in the rotor plate. Each hole 34 has a bushing 35 through which the yoke pins pass. There is sufficient space between the top of the solenoid and the underside of the rotor plate to permit a vertical movement of the yoke pins of approximately one-quarter inch.

The winding 56 is connected to contact brushes 61 and 63 which are mounted on a dielectric plate 60 secured to the frame 51 by means of the spacers 65 and the solenoid mounting screws 59.

Reference numeral 40 indicates a circular selector plate having a dependent peripheral flange 42 and a central opening 47. The selector plate is slidably seated by means of the flange 42 on top of the rotor plate 32, as shown in the Figure 10.

The selector plate is locked against rotation relative the rotor plate by means of three guide pins 44 that slidably interfit holes 38 in the rotor plate 32. This leaves the selector plate 40 free to move axially relative the rotor plate. The selector plate has two holes 46 through which the ends of the yoke pins 53 pass. Lock washers 55 fit into annular grooves 54 at the outer end of the yoke pins and hold the selector plate and yoke pins together. The axial movement of the selector plate relative the rotor plate is thus limited to the movement of the yoke pins referred to herein above as one-quarter inch.

Six springs 45 seated in equi-spaced blind holes 39 located in the top of the rotor plate bear against the under side of the selector plate to normally hold the selector plate 40 at its limit of travel away from the rotor plate flange 36, as is shown in the Figures 1 and 10.

Figure 9:
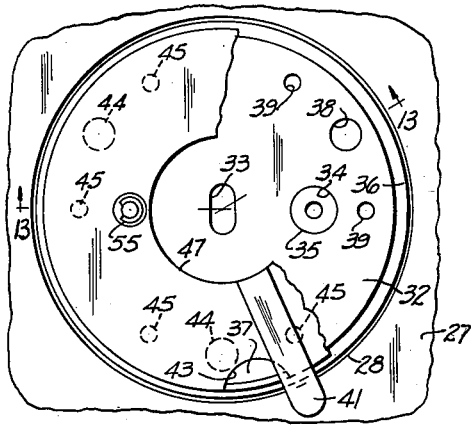
Figure 9 is a top plan view of the operator with a part of the selector plate broken away to show the rotor plate.
Figure 12:
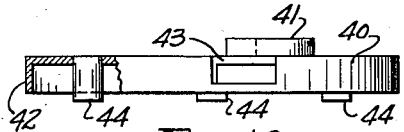
Figure 12 is a side elevation of the selector plate.

Energization of the solenoid causes the selector plate 40 to be moved toward the rotor plate by reason of the downward movement of the armature and associated yoke pins 53. Under such conditions the selector plate takes the alternate position indicated in broken lines by the reference numeral 40a. The selector plate has a semi-circular cam opening 43 cut in its edge as shown in the Figures 9 and 12. The shape and position of this cam opening 43 coincides with that of the cam slot 37 of the rotor plate 32. A radially extending selector arm 41 is mounted on the selector plate with its center line over the leading edge of the cam opening 43. The arm 41 extends beyond the periphery of the selector plate a distance sufficient to contact the hereinafter described primary valve operating cam 23 when in its operating position as shown in the Figures 1 and 3.

A distributor plate made of dielectric material is secured to the bottom of the operator case as shown in the Figure 1. A center switch point 69 which engages the center contact brush 61 of the solenoid is surrounded by switch points 68 which engage the brush 63 in progression as the plate 60 revolves as hereinafter described.

The number of switch points 68 varies with the number of valves to be controlled. In the instant installation, there are six valves necessitating six switch points 68. Each switch point 68 is oriented with its corresponding valve stem 22.

A fractional horse-power motor 30 is connected to the rotor plate through the shaft 31 whose lower end engages a keyway 33 cut in the top of the rotor plate 32 as shown in the Figures 1, 3, 9 and 13. The speed of the shaft is geared down to approximately one revolution per minute. The rotation of the shaft 31 causes the rotor plate 32 and its supported structure to rotate on its flange 36 within the shouldered opening or track 28 of the operator case 26.

A pair of vertically spaced cams 23 and 24 separated by spacers 25 are mounted on each valve stem in approximately the plane of the rotor plate 32. The upper or primary cam 23 is positioned so that when the selector plate 40 and arm 41 are in their extended position as shown in the Figure 1, the arm 41 will pass above the primary cam 23 as shown. However, when the solenoid 50 is energized, thereby causing the selector plate to move downward to the position designated by reference numeral 40a, the arm 41 will be caused to move to its alternate lowered position 41a, wherein it engages the cam 23, causing it and its associated valve stem 22 to rotate as the arm is moved past it by the rotation of the rotor plate 32. The lower or secondary cam 24 is positioned in the plane of the cam slot 37.

Referring to the Figure 3 it will be noted that the shape and relation of the two cams is such that the rotation of the stem 22 by the interaction of the cam 23 and the arm 41 causes the secondary cam 24 to enter the semi-circular cam slot 37 of the rotor plate 32 and be carried along by the rotating cam slot 37. It will be further noted by studying the Figure 3, that by reason of there being six valves spaced around the manifold a simple single cam and arm arrangement will not effect a ninety degree rotation of the valve stem required to either fully open or close the associated valve. By reason of the use of the two cams 23 and 24, the motion is initiated by the engagement of the arm 41 with the primary cam 23 and is brought to completion after the arm 41 is disengaged from the cam 23 by reason of the secondary action of the cam 24 which is moved into the position indicated by the reference numeral 24a by reason of its engagement with the rotor cam notch 37. The action is similar to that of a geneva wheel.

The employment of this camming arrangement permits valves to be spread on centers less than ninety degrees apart and still be turned through an angle of ninety degrees with each passage of the operator arm 41.

Reference character 70 indicates a cam located on each valve stem 22 which controls the operating motor relay and pump switches 71 and 72 respectively. These, in turn, activate their respective circuits in co-ordination with the position of the attached valve.

In order to illustrate a typical use of this magnetic valve operator, it was thought that a schematic wiring diagram of a zone heating system involving only a single zone would be helpful. It is to be understood, of course, that any number of zones may be so controlled.

Figure 15:
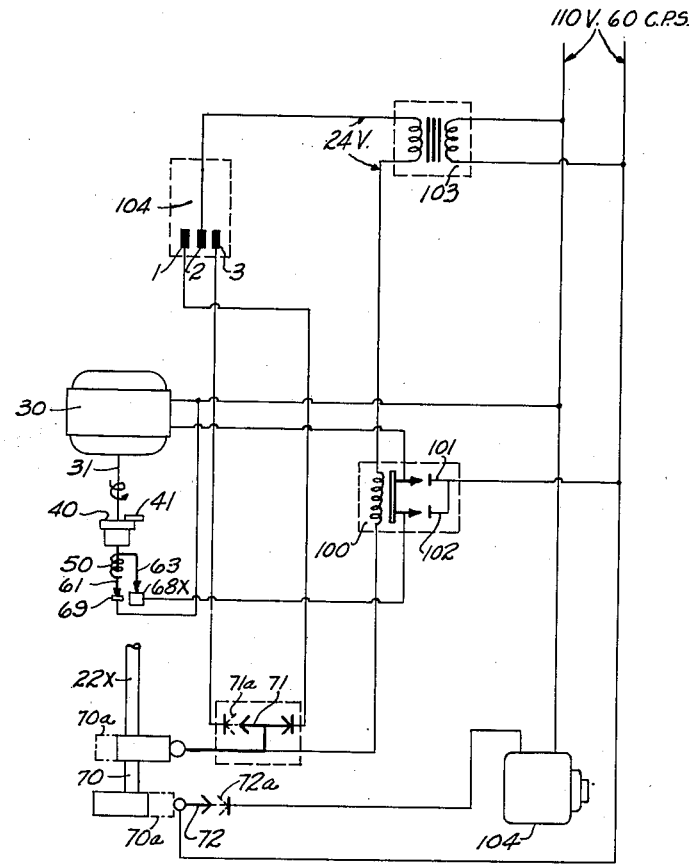
Figure 15 is a schematic wiring diagram of a typical valve controller circuit for which this device is adapted.

Referring to the Figure 15 there is seen a 110 volt A. C. line; a 24 volt step-down transformer 103; a conventional two position thermostat 104 having three contacts 1, 2 and 3 respectively; a two pole relay 100 having contacts 101 and 102 normally open; a two position relay switch 71 controlled by the cam 70; a normally open pump switch 72 also controlled by the cam 70 and connected to the water pump motor 104.

All these units are suitably connected to the valve operator motor 30 and solenoid 50 as indicated.

Let it be assumed that the particular valve associated with the valve stem 22x of the Figure 15, is in its closed position and therefore the system is shut down. The selector plate 40 of the operator is in its normal upward position due to the action of the springs 45. The motor 30 is inactive. The position of the cam 70 is such that the relay circuit switch 71 has closed the relay circuit leading to the number 1 contact on the thermostat 104 and the water pump switch 72 is open. Both the contacts 101 and 102 of the relay 100 are open thereby breaking the circuits of the motor 30 and the solenoid 50. Contact 1 is the cold side of the thermostat and contact 3 is the warm side of the thermostat. If, the heat sensitive arm carrying the contact 2 should engage contact 3 nothing would happen because the relay circuit is broken at the switch 71. If conditions become cooler, requiring operation of the heating system, the heat sensitive arm will bend to the left until contact 1 is engaged. This activates the relay 100 causing the contacts 101 and 102 to be closed. Closure of contact 101 causes the operator motor 30 to start turning the rotor plate 32. The closure of contact 102 completes the solenoid circuit up to the switch point 68x associated with the valve stem 22x at which point the circuit is open. Since the solenoid is unenergized the selector plate and arm 40 and 41 respectively, are held in their normal raised position by the springs 45. Therefore, the revolving arm 41 passes above all the cams 23 of the valves requiring no action until it approaches valve stem 22x. As the arm 41 approaches the cam 23 of the stem 22x, the contact 63 engages the particular switch point 68x associated with the valve stem 22x and the solenoid circuit is energized. The selector plate and arm 41 are pulled downward bringing the arm 41 into the plane of the cam 23 which is engaged and turned by the arm 41 as it travels past it, as indicated by the reference numerals 41a and 41b in the Figures 1 and 3.

As the rotor plate 32 and its attached distributor brush 63 continues to rotate, the brush 63 breaks contact with the switch point 68x just after the secondary cam 24 engages the rotor slot 37. The solenoid is de-energized permitting the selector plate 40 to move upward, under the action of the springs 45 carrying the selector arm 41 above the plane of the primary cam 23. The completion of the turning cycle of the valve stem 22x is carried on by the interlocked secondary cam 24 and the rotor slot 37.

This double cam arrangement not only effects a full ninety degree rotation of the valve stem under the conditions stated but also shortens the power period of the solenoid so that a relatively small winding may be used without danger of overheating.

The turning of the valve stem 22x and its valve through a full ninety degree angle moves the cam 70 to the position 70a wherein the pump motor switch 72 is moved to its closed position 72a causing the pump motor 104 to start circulating hot water through the newly opened valve. At the same time, the cam 70 has moved the relay switch 71 to its alternate position 71a which opens the relay circuit through thermostat contact 1. This opens the switch 101 which turns off the rotor motor 30 stopping the rotor plate 32. Under these conditions with the relay switch 71 in its alternate position 71a it will be seen that after the temperature of the zone rises sufficiently to cause the thermostat contact arm 2 to move over to contact 3 the circuit will be set up to repeat the action just described thereby turning the valve stem 22x through another ninety degrees to close its associated valve and shut down the circulation of hot water.

It is obvious that if other zone valves require the action of the operator to either open or close them the several heat zone circuits, which are duplicates of the single one illustrated, will keep the motor 30 and its associated rotor plate 32 rotating until all the valves have been operated upon in sequence.

While this electromagnetic valve operator is intended primarily for use in a controller for a zone heating system, such as described and illustrated herein, it is of course understood that the device may be used to control any type of apparatus that lends itself to the circular arrangement of its controlling elements about a common center.

Having thus disclosed the invention in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a valve, including a stem and a valve operating cam mounted thereon, an electromagnetic control device, comprising, a case member including means for supporting said valve stem; a rotor disc, rotatably mounted on said case member proximate the said cam; a selector plate, including an operating arm, slidably mounted on the said disc and movable axially relative thereto between an extended and a retracted position; spring means for normally biasing the said selector plate into its extended position, wherein the selector arm is out of alignment with the aforesaid cam and in non-cooperating position with reference to said cam; electromagnetic means mounted on the rotor disc, including an armature mounted on the selector plate, and operable when energized to draw the selector plate axially toward the rotor disc, against the biasing action of said spring means, into its retracted position, wherein the selector arm is in cooperable alignment with the aforesaid cam; and means for rotating the said rotor disc, thereby to rotate the said valve cam when the selector plate and arm are in their retracted co-operating position, and to pass the said cam by when the selector plate and arm are in their extended position.

2. In combination with a valve, including a stem and a valve operating cam mounted thereon, an electromagnetic control device, comprising, a case member including means for supporting said valve stem, the said case member also having a shouldered circular opening therein proximate the said valve stem and cam; a rotor disc having a laterally extending flange journaled in the said shouldered opening; a selector plate, including an operating arm, slidably mounted on the said disc and movable axially relative thereto between an extended and a retracted position; spring means for normally biasing the said selector plate into its extended position, wherein the selector arm is out of alignment with the aforesaid cam and in a non-cooperating position with reference to said cam; electromagnetic means mounted on the rotor disc, including an armature mounted on the selector plate, and operable when energized to draw the selector plate axially toward the rotor disc against the biasing action of said spring means, into its retracted position wherein the selector arm is in co-operable alignment with the aforesaid cam; and means for rotating the said rotor in the shouldered opening, thereby to rotate the said valve cam when the selector plate and arm are in their retracted co-operating position, and to pass the said valve cam by when the selector plate and arm are in their extended position.

3. In combination with a valve, including a stem and a valve operating cam mounted thereon, an electromagnetic control device, comprising, a case member, including means for supporting the said valve stem, the said case member also having a shouldered circular opening therein proximate the said valve stem and cam; a rotor disc having a laterally extending flange journaled in the said shouldered opening; a circular selector plate having a dependent peripheral flange and a radially extending arm, co-axially mounted on the said rotor disc and movable axially relative thereto, between an extended and a retracted position; spring means for normally biasing the said selector plate into its extended position, wherein the selector arm is out of alignment with the aforesaid cam and in a non-co-operating position with reference to said cam; electromagnetic means mounted on the rotor disc, including an armature mounted on the selector plate, and operable when energized to draw the selector plate axially toward the rotor disc, against the biasing action of said spring means, into its retracted position, wherein the selector arm is in co-operable alignment with the aforesaid cam; and means for rotating the said rotor disc in the shouldered opening, thereby to rotate the said valve cam when the selector plate and arm are in their retracted co-operating position, and to pass the said valve cam by when the selector plate and arm are in their extended position.

4. In combination with a valve, including a stem and a valve operating cam mounted thereon, an electromagnetic control device, comprising, a case member including means for supporting said valve stem; a rotor disc rotatably mounted on said case member proximate the said cam; a selector plate, including an operating arm, slidably mounted on said disc and movable axially relative thereto between an extended and a retracted position; spring means for normally biasing the said selector plate into its extended position, wherein the selector arm is out of alignment with the aforesaid cam and in a non-co-operating position with reference to said cam; a solenoid coil mounted on the under-side of said rotor disc, including an armature movable therein and dependent from the said selector plate, the said armature being movable between a first un-energized position, when the selector plate is in its normal extended position, and a second energized position, when the solenoid coil energized, whereby the selector plate attached thereto is moved axially of the rotor disc into its retracted position wherein the selector arm is in co-operable alignment with the aforesaid cam; and means for rotating the said rotor disc, thereby to rotate the said valve cam when the selector plate and arm are in their retracted co-operating position and to pass the said cam by when the selector plate and arm are in their extended position.

5. In combination with a valve, including a stem and a valve operating cam mounted thereon, an electromagnetic control device, comprising, a case member including means for supporting said valve stem, the said case member also having a shouldered circular opening therein proximate the said valve stem and cam; a rotor disc having a laterally extending flange journaled in the said shouldered opening; a selector plate, including an operating arm, slidably mounted on the said disc and movable axially relative thereto between an extended and a retracted position; spring means for normally biasing the said selector plate into its extended position, wherein the selector arm is out of alignment with the aforesaid cam and in a non-co-operating position with reference to said cam; a solenoid coil mounted on the underside of said rotor disc, including an armature movable therein, and dependent from the said selector plate, the said armature being movable between a first unenergized position when the selector plate is in its normally extended position, and a second energized position when the solenoid coil is energized, whereby the selector plate attached thereto is moved axially of the rotor disc into its retracted position wherein the selector arm is in co-operable alignment with the aforesaid cam; means for rotating the said rotor disc, thereby to rotate the said valve cam when the selector plate and arm are in their retracted co-operating position and to pass the said cam by when the selector plate and arm are in their extended position.

6. In combination with a valve, including a stem and a valve operating cam mounted thereon, an electromagnetic control device, comprising, a case member including means for supporting said valve stem, the said case member also having a shouldered circular opening therein proximate the said valve stem and cam; a rotor disc having a laterally extending flange journaled in the said shouldered opening; a circular selector plate having a dependent peripheral flange and a radially extending arm co-axially mounted on the said rotor disc and movable axially relative thereto, between an extended and a retracted position; spring means for normally biasing the said selector plate into its extended position, wherein the selector arm is out of alignment with the aforesaid cam and in a non-co-operating position with reference to said cam; a solenoid coil mounted on the underside of said rotor disc, including an armature movable therein, and dependent from the said selector plate, the said armature being movable between a first unenergized position when the selector plate is in its normally extended position and a second energized position when the solenoid is energized, whereby the selector plate attached thereto is moved axially of the rotor disc into its retracted position wherein the selector arm is in co-operable alignment with the aforesaid cam; and means for rotating the said rotor disc in the shouldered opening, thereby to rotate the said valve cam when the selector plate and arm are in their retracted co-operating position, and to pass the said valve cam by when the selector plate and arm are in their extended position.

7. In combination with a plurality of valves, including stems and a valve operating cam mounted on each stem, arranged in a circle and having all of their cams aligned in the same plane, an electromagnetic control device, comprising, a case member including means for supporting all of the aforesaid valve stems and cams in spaced relation about a common center; a rotor disc rotatably mounted on the case member at the common center; a selector plate, including an operating arm, slidably mounted on the said disc and movable axially relative thereto between an extended and a retracted position; spring means for normally biasing the said selector plate into its extended position, wherein the selector arm is out of alignment with the aforesaid cams and in non-co-operating position with reference to all of said cams; electromagnetic means mounted on the rotor disc, including an armature mounted on the selector plate, and operable when energized to draw the selector plate axially toward the rotor disc, against the biasing action of said spring means, into its retracted position, wherein the selector arm is in co-operable alignment with the aforesaid cams; and means for rotating the said rotor disc, thereby to rotate each of said valve cams successively when the said selector plate and arm are in their retracted co-operating position, and to successively pass each of the said cams by when the selector plate and arm are in their extended position.

8. In combination with a plurality of valves, including stems and a valve operating cam mounted on each stem, arranged in a circle and having all of their cams aligned in the same plane, an electromagnetic control device, comprising, a case member including means for supporting all of the aforesaid valve stems and cams in spaced relation about a common center, the said case member also having a shouldered circular opening therein at the common center; a rotor disc having a laterally extending flange journaled in the said shouldered opening; a circular selector plate having a dependent peripheral flange and a radially extending arm coaxially mounted on the said rotor disc and movable axially relative thereto, between an extended and a retracted position; spring means for normally biasing the said selector plate into its extended position, wherein the selector arm is out of alignment with the aforesaid cams and in a non-co-operating position with reference to all of said cams; a solenoid coil mounted on the under-side of said rotor disc, including an armature movable therein and dependent from said selector plate, the said armature being movable between a first unenergized position when the selector plate is in its normally extended position and a second energized position, when the solenoid coil is energized, whereby the selector plate attached thereto is moved axially of the rotor disc into its retracted position, wherein the selector arm is in co-operable alignment with the aforesaid cams; means for rotating the said rotor disc in the shouldered opening, thereby to rotate each of said valve cams successively when the selector plate and arm are in their retracted co-operating position, and to successively pass each of the said cams by when the selector plate and arm are in their extended position.

HARRY BAXTER.

References Cited in the file of this patent

UNITED STATES PATENTS

| Number | Name | Date |
|---|---|---|
| 2,530,563 | Baxter | Nov. 21, 1950 |